United States Patent [19]

Kafka

[11] Patent Number: 4,829,529
[45] Date of Patent: May 9, 1989

[54] LASER DIODE PUMPED FIBER LASERS WITH PUMP CAVITY

[75] Inventor: James D. Kafka, Mountain View, Calif.

[73] Assignee: Spectra-Physics, Inc., San Jose, Calif.

[21] Appl. No.: 62,739

[22] Filed: Jun. 15, 1987

[51] Int. Cl.$^4$ ............................ H01S 3/30; G02B 6/22
[52] U.S. Cl. ....................................... 372/6; 350/96.33
[58] Field of Search .......................... 372/6; 350/96.33

[56] References Cited

U.S. PATENT DOCUMENTS 4,637,025  1/1987  Snitzer et al. ........................... 372/6

FOREIGN PATENT DOCUMENTS 2441858  7/1980  France ............................... 350/96.33

Primary Examiner—William L. Sikes
Assistant Examiner—Georgia Y. Epps
Attorney, Agent, or Firm—Paul Davis

[57] ABSTRACT

A fiber laser having a single mode fiber core of laser material is pumped by a high power coherent laser diode source by providing a multi-mode fiber around the single mode core to define a pump cavity which propagates pump radiation while allowing the pump radiation to couple to the single mode core. Laser diode arrays and extended emitter laser diodes can be used to pump a single mode fiber by inputting the pump radiation into the multi-mode fiber surrounding the single mode fiber core. The milti-mode fiber has a much greater diameter than the single mode core.

18 Claims, 1 Drawing Sheet

LASER DIODE PUMPED FIBER LASERS WITH PUMP CAVITY

BACKGROUND OF THE INVENTION

The invention relates to fiber lasers and more particularly to method and apparatus for pumping a fiber laser.

In a fiber laser, neodymium, or another rare earth such as erbium, terbium or praseodymium, is doped into the core of an optical fiber to provide an active gain medium. Pumping radiation input into the fiber causes lasing action in the fiber. Pump light at 800 nm, e.g. from a laser diode, produces an emission at 1.08 microns in a Nd-doped core. Single mode fibers are preferred for fiber lasers in order to produce single mode output. However, singe mode fibers have very small core diameters, typically 5–10 microns. Single stripe laser diodes can be focused into a single mode fiber core, but single stripe laser diodes are presently limited to about 30 mw output and thus are not well suited for pumping the fiber laser because of their low energy. Multi-spatial mode phase locked diode arrays and multi-spatial mode extended emitter laser diodes are presently available with output powers in the range 100–1000 mW or higher and are desirable as pump sources. However these high power diode arrays and extended emitter diodes produce multi-spatial mode output which cannot be effectively coupled into a single mode fiber core. Because of their poor beam quality, only about 10% of the light can be focused into the single mode fiber. Multi-mode fibers are much larger than single mode fibers, with typical core diameters of about 50–100 microns, so it is much easier to couple pump radiation into the fiber. However, a multi-mode fiber must be pumped harder to make it lase, typically requiring argon lasers or dye lasers as pump sources. In addition, the poor beam quality of the multi-spatial mode output makes the multi-mode fiber far less suitable than the single mode fiber for use in a fiber laser.

Thus the problem that presently exists in the development of a compact, low cost, reliable and efficient fiber laser is that the ideal combination is a single mode fiber pumped by a high power coherent laser diode source, either phase locked laser diode arrays or extended emitter laser diodes, but it is not possible to effectively couple these sources into a single mode fiber. Instead it is presently possible to pump a single mode fiber with a low power single stripe laser diode, or to use the high power coherent laser diode sources to pump a multi-mode fiber; neither of these combinations are particularly desirable because of the lower power source in the first case or the poor beam quality output in the second case.

U.S. Pat. No. 3,808,549 to Maurer, issued Apr. 30, 1974, discloses an optical waveguide light source in which light from an incoherent source, a plurality of LED's, is input into an optical fiber having a core of laser material surrounded by a first transparent cladding layer with a second cladding layer on the first layer. The refractive index of the first layer is less than that of the core and greater than that of the second layer, so that light from the incoherent source is propagated longitudinally along the fiber and coherent light is generated in the core of laser material by absorption of incoherent pump light propagating through the fiber. The coherent output from this source is coupled into a (fiber) waveguide. Thus Maurer shows a fiber optic coherent light generator, but does not use a coherent pumping source, does not use a single mode fiber, and does not form a complete laser.

SUMMARY OF THE INVENTION

Accordingly it is an object of the invention to provide a single mode fiber laser pumped by a coherent high power laser diode source.

It is a further object of the invention to utilize multi-spatial mode phase locked laser diode arrays and extended emitter laser diodes to pump a single mode fiber core in a fiber laser.

It is also an object of the invention to provide a single mode fiber laser with efficient coupling between the fiber and a coherent high power laser diode source.

The invention is a fiber laser pumped by a high power laser diode source using a special fiber configuration which provides a multi-mode fiber pump cavity around a single mode laser core to couple the pump radiation to the laser gain medium. The fiber is made of a single mode fiber core of laser gain material which is placed inside a multi-mode fiber of much greater diameter. The pump radiation is input into the multi-mode fiber which totally internally reflects the pump radiation so that it passes through the single mode laser core many times to effectively pump the laser. The fiber is placed in a resonant cavity and pumped by a laser diode array or extended emitter laser diode.

DETAILED DESCRIPTION OF THE PREFERRED EMBODIMENTS

Figure 1:
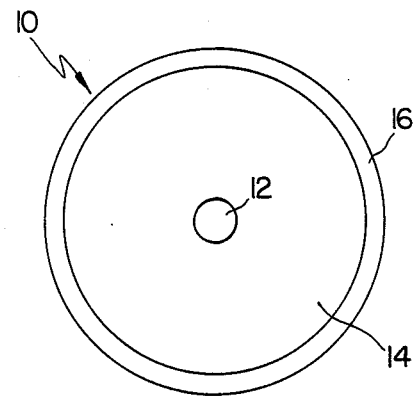
FIG. 1 is a cross-sectional end view of a single mode fiber with associated multi-mode fiber pumping cavity for coupling pumping radiation from a coherent high power laser diode source to the single mode fiber.

As shown in FIG. 1, a fiber 10 according to the invention is formed by surrounding a single mode fiber core 12 with a multi-spatial mode core 14 which contacts core 12 and an outer layer or clad 16 which contacts core 14. The assembly of core 12, core 14, and clad 16 thus forms a single mode fiber within a multi-mode fiber which forms the fiber 10. The single mode core 12 is made of a laser material, i.e. doped with a laser ion such as neodymium. Fiber 10 may be formed by the method of U.S. Pat. No. 3,808,549, which is herein incorporated by reference, or by any other known method for forming a multilayer optical fiber.

Figure 2:
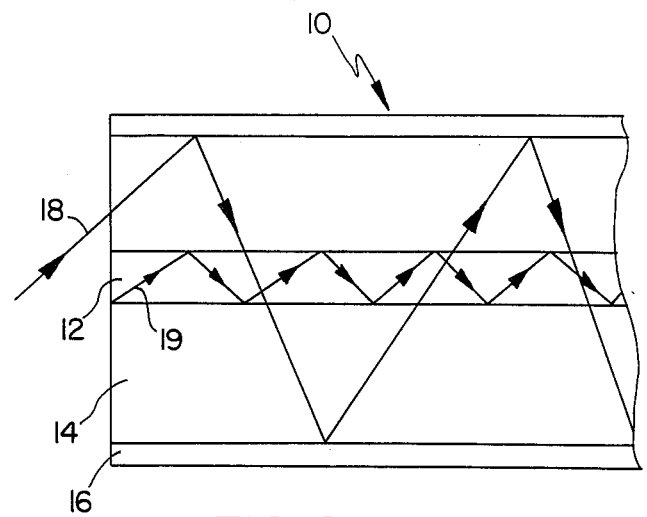
FIG. 2 is a cross-sectional side view of the fiber with pumping cavity of FIG. 1.
Figure 4:
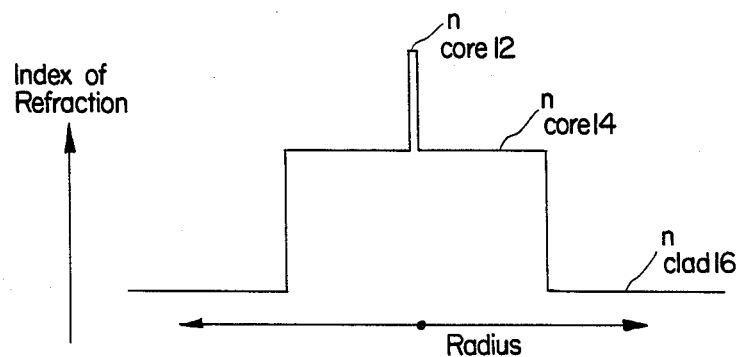
FIG. 4 is a graphical representation of the indexes of refraction of the single mode fiber and pumping cavity of FIGS. 1 and 2.

The multi-mode fiber core 14 and clad 16 define a pump cavity for the single mode core 12. The index of refraction of the multi-mode core 14 is less than the index of the single mode core 12, and the index of clad 16 is less than the index of the multi-mode core 14, as illustrated in FIG. 4. The indexes of refraction and entrance angle of pump radiation 18 are chosen so that pumping radiation 18 which is input into one end of fiber 10 will be totally internally reflected at the interface between core 14 and clad 16 and propagate along fiber 10, as shown in FIG. 2. As the pumping radiation 18 propagates along fiber 10 it passes many times through core 12 of laser material, thus providing effective coupling of the pumping radiation to the laser gain medium. (Pumping radiation 18 that enters core 12 will also exit core 12 unless absorbed in core 12.) However, laser radiation 19 produced in core 12 is totally internally reflected at the interface between core 14 and core 12 so the laser radiation is trapped within and propagates along single mode core 12.

The single mode core is typically 5–10 microns in diameter, and made of a laser gain material, e.g. Nd-doped laser glass. The core 12 must be doped sufficiently to absorb enough of the pump light. Any rare earth doped laser material may be used, particularly neodymium doped, and also erbium or terbium doped. Any suitable host material which can be formed into a fiber can be used, particularly glass materials. The multi-mode core and clad are typically about 50–100 microns in diameter, and made of any suitable fiber materials that transmit the pumping radiation. Because of the ratios of areas of about 100:1, it is relatively easy to couple the pump radiation into the multi-mode fiber and thus pump the single mode core. The length of fiber 10 and the angle of incidence of the pump radiation can be chosen to maximize the coupling of the pump radiation to the single mode core. A typical length of fiber 10 in a fiber laser is about 10–50 m.

Figure 3:
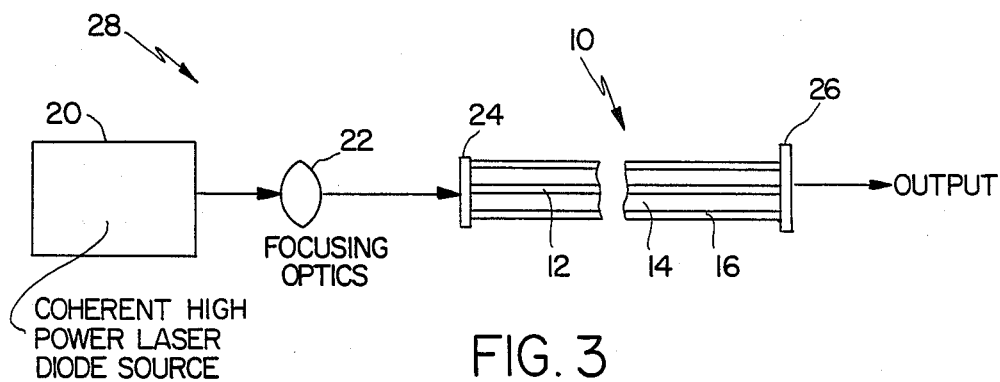
FIG. 3 is a schematic view of a fiber laser using the single mode fiber and pumping cavity of FIGS. 1 and 2.

A laser system 28 which utilizes the fiber 10 is illustrated in FIG. 3. The fiber 10 having single mode core 12 of laser gain medium surrounded by multi-mode core 14 and clad 16 is enclosed between a pair of mirrors 24, 26 to define a resonant cavity. Mirror 26 also forms the output coupling means to allow laser radiation to be removed from the resonant cavity. Mirrors 24, 26 are placed at the ends of fiber 10 in optical alignment to produce the resonant cavity; alternatively other cavity definition means can be used. Mirror 24 is highly transmissive to pump radiation and highly reflective to laser radiation while mirror 26 is partly transmissive to laser radiation to provide output coupling. Pump radiation from a coherent high power laser diode source 20 is focused by focusing optics 22 and input into fiber 10 through mirror 24. Alternatively, other arrangements for inputing the pumping radiation into fiber 10 can be used. The pump radiation need only be coupled into the pump cavity defined by multi-mode core 14 and clad 16, from which it is coupled into single mode core 12 of laser material.

The coherent high power laser diode source 20 according to the invention includes laser diode arrays in which a plurality of diode emitters (typically 10 or more) are phase locked together and a multi-spatial mode extended emitter laser diode. The diode arrays are exemplified by gallium aluminum arsenide (GaAlAs) laser diode arrays Model No. 2410 manufactured by Spectra Diode Labs, San Jose, Calif. The single broad stripe or extended emitter laser diodes are exemplified by Sony Corp. Model Nos. SLD 301V/w having output power of 100 mW; SLD 302V/w (200 mw); SLD 303V/w (500 mw); SLD 304V/w (1000 mW), as described in Sony News and Information Bulletin No. 87S-013, 1987, and Sony Semiconductor Data Book 1987 AlGaAs Laser Diodes, which are herein incorporated by reference.

Changes and modifications in the specifically described embodiments can be carried out without departing from the scope of the invention which is intended to be limited only by the scope of the appended claims.

I claim:

1. A fiber laser, comprising:
   a laser optical fiber comprising a single mode fiber core of laser material and a multi-mode fiber surrounding the single mode fiber core and forming a pump cavity around the single mode core;
   a high power coherent laser diode source operatively associated with the laser optical fiber to provide coherent pumping radiation into the pump cavity;
   means, operatively associated with the laser optical fiber to form a resonant laser cavity.

2. The fiber laser of claim 1 wherein the multi-mode fiber has a multi-mode core contacting the single mode core and a clad contacting the multi-mode core, the multi-mode core having an index of refraction less than the single mode core and greater than the clad.

3. The fiber laser of claim 1 wherein the laser diode source is a multi-spatial mode phase locked laser diode array.

4. The fiber laser of claim 1 wherein the laser diode source is a multi-spatial mode broad stripe extended emitter laser diode.

5. The fiber laser of claim 1 wherein the single mode fiber core is made of neodymium doped laser material.

6. The fiber laser of claim 5 wherein the single mode fiber core is made of neodymium doped glass.

7. The fiber laser of claim 1 further including focusing means for focusing pumping radiation from the laser diode source into the pump cavity.

8. The fiber laser of claim 1 wherein the cavity means comprise a pair of mirrors, one at each end of the laser optical fiber and optically aligned to form a resonant cavity, one mirror being highly transmissive to pump radiation from the laser diode source and the other mirror being partly transmissive to laser radiation from the single mode core to provide output coupling.

9. The fiber laser of claim 1 wherein the cross-sectional areas of the multi-mode fiber core and single mode fiber are in a ratio of about 100:1.

10. The fiber laser of claim 1 wherein the length of the laser optical fiber and the critical angle for total internal reflection in the multi-mode fiber are such that pump radiation propagating along the multi-mode fiber traverses the single mode fiber many times.

11. The fiber laser of claim 10 wherein the length of the laser optical fiber is about 10–50 m.

12. The fiber laser of claim 1 wherein the single mode fiber core is made of a rare earth doped laser material.

13. The fiber laser of claim 12 wherein the single mode fiber core is doped with erbium or terbium.

14. A method of pumping a single mode fiber core of laser material by means of a high power coherent laser diode source, comprising:
   surrounding the single mode fiber core by a multi-mode fiber to form a pump cavity around the single mode fiber core;
   inputing pump radiation from the laser diode source into the multi-mode fiber to propagate along the multi-mode fiber and pump the single mode fiber core.

15. The method of claim 14 further comprising forming the multi-mode fiber of a multi-mode core contacting the single mode core and a clad contacting the multi-mode core, the multi-mode core having an index of refraction less than the single mode core and greater than the clad.

16. The method of claim 14 further comprising forming the laser diode source from a multi-spatial mode phase locked laser diode array.

17. The method of claim 14 further comprising forming the laser diode source from a multi-spatial mode broad stripe extended emitted laser diode.

18. The method of claim 14 further including forming the single mode fiber core of a neodymium doped glass.

* * * * *